W. F. LOSEBROCK.
ROTARY CONVERTER AND TRANSFORMER.
APPLICATION FILED AUG. 29, 1913.

1,125,914.

Patented Jan. 19, 1915.

Witnesses:
W. R. Palmer
Frank Sperling

Inventor:
Wilhelm F. Losebrock

UNITED STATES PATENT OFFICE.

WILHELM F. ROSEBROCK, OF FARGO, NORTH DAKOTA.

ROTARY CONVERTER AND TRANSFORMER.

1,125,914.  Specification of Letters Patent.  Patented Jan. 19, 1915.

Application filed August 29, 1913. Serial No. 787,387.

*To all whom it may concern:*

Be it known that I, WILHELM F. ROSEBROCK, a citizen of the United States, residing at Fargo, in the county of Cass and State of North Dakota, have invented a new and useful Rotary Converter and Transformer, of which the following is a specification.

The present invention relates to improvements in rotary transformers or converters, one object of the present invention, being the provision of a rotary transforming or converting member operated by a synchronous motor, and in which the synchronous motor is provided with manually controlled means whereby the motor may be placed in synchronism so that the pulsations from the alternating current will properly rotate the motor and the current will be converted into direct current.

A further object of the present invention is to provide a small and compact converter especially adapted for use upon a motor car to deliver direct current to the motor thereof from an alternating current supplied.

A further object of the invention is the provision of a novel construction of a rotary contact carrying member, the same being provided with a plurality of even number of contact surfaces, which are disposed to be engaged respectively, with the brushes leading from the alternating current source to the brushes leading to the direct current leads.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
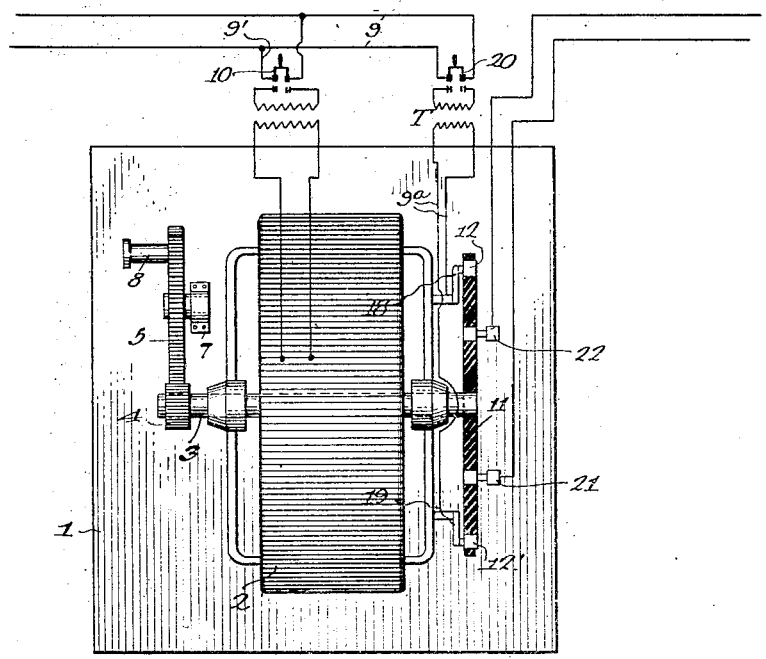
Figure 2:
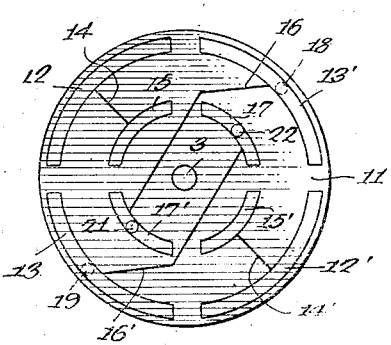

In the drawings Figure 1 is a top plan view of the complete rotary transformer or converter, with the electrical circuits in diagram. Fig. 2 is a plan view taken from one side of the rotary member thereof showing the direct current brushes in elevation and the alternating current brushes in dotted lines.

Referring to the drawings, the numeral 1 designates the base upon which is mounted a synchronous motor 2, of any preferred type, the same carrying the shaft 3 which upon one end is provided with a small pinion 4, a large pinion 5 being carried by the shaft journaled in the standard 7 upon the base 1 and in mesh at all times with the pinion 4. A handle 8 is carried by the large gear 5, at one side thereof and in ready position, whereby the same may be gripped and shaft 3 instantly rotated to place the motor in step with the alternations of the current led from the conductors 9 and before the switch 10 is closed to supply current to the motor through the conductors 9'.

The two conductors 9 are disposed to lead the alternating current from an alternating current source (not shown), and has branched therefrom, the two conductors 9', which lead to the transformer T, and through the switch 10 to control the operation of the synchronous motor 2. The conductors 9ᵃ are branched from the conductors 9, and controlled by the switch 20, so that the alternating current will be led to the respective contacts 18 and 19 supported upon the base.

The converter, as clearly shown is preferably a disk 11 of insulating material, which is adjustably connected to and rotatable with the shaft 3, the same being provided with the diametrically disposed segmental contact plates 12—12' and 13—13' embedded therein and disposed to be contacted by the free ends of the contact arms 18 and 19 during the rotation of the disk 11. The plates 12—12' and 13—13' are disposed in the same circumferential line, so that as the disk 11 is rotated, the contact arms 18 and 19 are alternately brought into engagement with the plates 12—12' and 13—13'. Leading from the contact plates 12—12' are conductors 14—14', which are connected to the inner segmental plates 15—15' which are disposed within and concentric to the plates 12—12' and in the path to be engaged by the contact arms 21 and 22, which are disposed upon the base 1 and at the opposite side of the disk 11 to the contact arms 18 and 19.

Conductors 16—16' connect the plates 13—13' with the plates 17—17', which are disposed in circumferential alinement with the segmental plates 15—15'.

Leading from the respective contact arms 21 and 22, are the conductors 23—23' which lead the direct or converted current away from the contact plates 15—15' and 17—17'.

A transformer T' is shown connecting the conductors 9ª to the mains, this being employed to step the voltage to any desired amount according to the use to which it is to be put. The disk 11, though shown as made of insulation, may be made of any material, the contact plates being properly insulated.

From the foregoing description, taken in connection with the drawings, it is evident that with a converter or rotary transformer constructed according to and embodying the present invention, that the member 11 will be rotated in synchronism, with the motor 2. By this means, it will be seen that the alternating current led to the contact plates of the member 11, through the contact arms 18 and 19, will have the impulses so selected and divided therefrom that when delivered to and through the contact arms 20 and 21 a direct current will be caused to flow out upon the line consisting of the conductors 23—23'.

It is also evident that with a rotary transformer or converter of this construction, that as the member 11 is constructed of few parts, the cost will be considerably reduced, and that a machine of this character will be especially adapted for use upon alternating propulsion current trolley cars, where it is desired to convert the propulsion current generally employed into a direct current for operating the motor.

What is claimed is:

1. A rotary transformer or converter, including a base, a synchronous motor mounted thereon, a rotary disk operably connected thereto, a plurality of pairs of contact plates disposed in interrupted circumferential alinement with each other, a pair of alternating current receiving contact arms mounted upon the base and disposed to contact said plates, a similar number of circumferentially disposed contact plates carried by the disk and in interrupted circumferential alinement with each other, and a pair of direct current contact arms mounted upon the base and disposed for engagement with the latter contact plates.

2. A rotary transformer or converter, including a base, a synchronous motor mounted thereon, a rotary disk operably connected thereto, a plurality of pairs of contact plates forming an outer ring disposed in interrupted circumferential alinement with each other, a pair of alternating current receiving contact arms mounted upon the base and disposed to contact said plates, a similar number of circumferentially disposed contact plates carried by the disk and in interrupted circumferential alinement with each other, and a pair of direct lead current contact arms mounted upon the base and disposed for engagement with the latter contact plates, the diametrically opposite latter contact plates being in circuit with the diametrically opposite contact plates of the outer ring of the first series.

In testimony that I claim the foregoing as my own, I have hereto affixed my signature in the presence of two witnesses.

WILHELM F. ROSEBROCK.

Witnesses:
 FRANK R. SCOTT,
 A. T. COMSTOCK.